US010066669B2

(12) United States Patent
Sasaki

(10) Patent No.: US 10,066,669 B2
(45) Date of Patent: Sep. 4, 2018

(54) BEARING DEVICE AND ROTARY MACHINE

(71) Applicant: MITSUBISHI HEAVY INDUSTRIES COMPRESSOR CORPORATION, Tokyo (JP)

(72) Inventor: Yuichi Sasaki, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 15/561,629

(22) PCT Filed: Mar. 31, 2015

(86) PCT No.: PCT/JP2015/060186
§ 371 (c)(1),
(2) Date: Sep. 26, 2017

(87) PCT Pub. No.: WO2016/157430
PCT Pub. Date: Oct. 6, 2016

(65) Prior Publication Data

US 2018/0073562 A1    Mar. 15, 2018

(51) Int. Cl.
*F16C 33/08*    (2006.01)
*F16C 33/10*    (2006.01)
*F16C 41/00*    (2006.01)

(52) U.S. Cl.
CPC ............ *F16C 33/08* (2013.01); *F16C 33/108* (2013.01); *F16C 41/00* (2013.01)

(58) Field of Classification Search
CPC .................................................. F16C 33/108
See application file for complete search history.

(56) References Cited

U.S. PATENT DOCUMENTS

| 4,597,676 A | 7/1986 | Vohr et al. |
| 5,518,321 A * | 5/1996 | Hata .................. F16C 33/108 |
| | | 384/311 |

(Continued)

FOREIGN PATENT DOCUMENTS

| DE | 696 08 238 T2 | 2/2001 |
| EP | 0 368 558 A2 | 5/1990 |

(Continued)

OTHER PUBLICATIONS

International Search Report dated Jun. 30, 2015 in Application No. PCT/JP2015/060186 with an English Translation.

(Continued)

*Primary Examiner* — Thomas R Hannon
(74) *Attorney, Agent, or Firm* — Birch, Stewart, Kolasch & Birch, LLP

(57) ABSTRACT

The present invention relates to a bearing device (61) provided with: a plurality of bearing pads (72) arranged between the outer peripheral surface of a turbine rotor (30) and the inner peripheral surface of a bearing housing (71) so as to be separated from each other in the circumferential direction of the rotor (30), the bearing housing (71) externally surrounding the rotor (30), the bearing pads (72) being supported on the inner peripheral surface of the bearing housing (71) and rotatably supporting the rotor (30); and a thermometer (75) provided to at least one of the plurality of bearing pads (72). The thermometer-equipped bearing pad (73) provided with the thermometer (75) has: a pad body (90) disposed facing the outer peripheral surface of the rotor (30); and a pair of pad shoulders (91) having different shapes and protruding from the pad body (90) to both sides of the bearing housing (71) in the direction of the center axis (O1) thereof. The bearing housing (71) has a pair of housing (Continued)

shoulders (78) having a shape corresponding to that of the pair of pad shoulders (91).

20 Claims, 12 Drawing Sheets

(56) References Cited

U.S. PATENT DOCUMENTS 9,534,637 B2 * 1/2017 Livermore-Hardy ........................ F16C 37/002
9,618,048 B2 * 4/2017 Nicholas ............... F16C 37/002

FOREIGN PATENT DOCUMENTS

| | | |
|---|---|---|
| JP | 58-180814 A | 10/1983 |
| JP | 1-128018 U | 8/1989 |
| JP | 2010-156360 A | 7/2010 |

OTHER PUBLICATIONS

Written Opinion dated Jun. 30, 2015 in Application No. PCT/JP2015/060186 with an English Translation.

* cited by examiner

BEARING DEVICE AND ROTARY MACHINE

TECHNICAL FIELD

The present invention relates to a bearing device which is applied to a rotary machine such as a steam turbine, a gas turbine, a compressor, or a turbocharger, and a rotary machine having the bearing device.

BACKGROUND ART

In the related art, as a bearing device which supports a rotary shaft of a rotary machine such as a steam turbine, a gas turbine, a compressor, or a turbocharger, a tilting pad bearing described in PTL 1 is known. In the tilting pad bearing, a bearing housing and a plurality of bearing pads which are arranged in the circumferential direction of the rotary shaft in the bearing housing and rotatably support the rotary shaft are provided.

However, a bearing device is known, in which a thermometer is provided in the bearing pad to monitor the state of the bearing device during an operation of a rotary machine.

CITATION LIST

Patent Literature

[PTL 1] Japanese Unexamined Patent Application Publication No. 2010-156360

SUMMARY OF INVENTION

Technical Problem

Here, when a bearing pad having a thermometer is assembled to a bearing housing, if an assembly direction is incorrect, the thermometer is not disposed at a predetermined position in the bearing pad, and there is a possibility that the state of the bearing device cannot be correctly ascertained by the thermometer.

The present invention provides a bearing device and a rotary machine in which a bearing pad can be correctly assembled.

Solution to Problem

According to a first aspect of the present invention, there is provided a bearing device, including: a bearing housing which is formed in an annular shape and surrounds a rotary shaft from an outer peripheral side; a plurality of bearing pads which are disposed between an outer peripheral surface of the rotary shaft and an inner peripheral surface of the bearing housing so as to be separated from each other in a circumferential direction of the rotary shaft, the bearing pads being supported on the inner peripheral surface of the bearing housing and rotatably supporting the rotary shaft; and a thermometer which is provided in at least one of the plurality of bearing pads, in which the bearing pad having the thermometer includes a pad body which is disposed to face the outer peripheral surface of the rotary shaft, and a pair of pad shoulders which protrudes from the pad body to both sides of the bearing housing in a direction of a center axis of the bearing housing and has shapes different from each other, and the bearing housing includes a pair of housing shoulders having a shape corresponding to that of each of the pair of pad shoulders.

According to this bearing device, the bearing pad having the thermometer has the pair of pad shoulders having shapes different from each other, and the bearing housing has the housing shoulder corresponding to the shape of each pad shoulder. Accordingly, when the bearing pad is assembled to the bearing housing, the bearing pad is not assembled in the opposite direction in the direction of the center axis of the bearing housing. That is, the bearing pad cannot be physically assembled to the bearing housing in the opposite direction.

In the bearing device according to a second aspect of the present invention, in the first aspect, each of the pair of pad shoulders may include a pad shoulder surface which faces the center axis side and is disposed along the outer peripheral surface of the rotary shaft, and wherein distances from the center axis to the pad shoulder surfaces of the pair of pad shoulders in the radial direction may be different from each other.

In this way, in the pair of pad shoulders, since the distances of the pair of pad shoulder surfaces in the radial direction are different from each other, the pad shoulder surfaces of the pair of pad shoulders are disposed at positions different from each other in the radial direction of the rotary shaft. Accordingly, the bearing pad cannot be physically assembled to the bearing housing in the opposite direction in the direction of the center axis of the bearing housing. Therefore, it is possible to dispose the thermometer provided in the bearing pad at a predetermined position of the bearing housing and it is possible to accurately measure a temperature of the bearing device.

In the bearing device according to a third aspect of the present invention, in the first or second aspect, each of the pair of pad shoulders may include the pad shoulder surface which faces the center axis side and is disposed along the center axis, and length dimensions of the pad shoulder surfaces of the pair of pad shoulders in a direction of the center axis may be different from each other.

In the pair of pad shoulders, since the length dimensions of the pair of pad shoulder surfaces in the direction of the center axis are different from each other, it is not possible to physically assemble the bearing pad to the bearing housing in the opposite direction in the direction of the center axis of the bearing housing. Therefore, it is possible to dispose the thermometer provided in the bearing pad at a predetermined position of the bearing housing and it is possible to accurately measure a temperature of the bearing device.

In the bearing device according to a fourth aspect of the present invention, in any one of the first to third aspects, each of the pair of pad shoulders may include the pad shoulder surface which faces the center axis side and is disposed along the outer peripheral surface of the rotary shaft, and the pad shoulder surface of one pad shoulder may be inclined to move close to or away from the center axis from one side of the center axis toward the other side thereof.

In this way, since the pad shoulder surface of the one pad shoulder is formed as the inclined surface, the bearing pad cannot be physically assembled to the bearing housing in the opposite direction in the direction of the center axis of the bearing housing. Accordingly, it is possible to dispose the thermometer provided in the bearing pad at a predetermined position of the bearing housing and it is possible to accurately measure a temperature of the bearing device.

In the bearing device according to a fifth aspect of the present invention, in any one of the first to fourth aspects, a positioning hole may be formed in the bearing pad having the thermometer, the positioning hole is recessed from the outside in the radial direction at a position close to one side in the direction of the axis from a center position of the bearing pad in the direction of the center axis, and a positioning member may be provided in the bearing housing, and the positioning member can be inserted into the positioning hole, protrudes from the bearing housing to the inside in the radial direction, and supports the bearing pad in the bearing housing.

In this way, since the positioning member and the positioning hole are provided, when the bearing pad having the thermometer is assembled, even if the bearing pad is forcedly assembled to the bearing pad in the opposite direction in the direction of the center axis of the bearing housing, in this case, the position of the positioning hole and the position of the positioning member do not coincide with each other. Accordingly, it is not possible to insert the positioning member into the positioning hole. Therefore, it is possible to further increase effects for preventing reverse assembly of the bearing pad having the thermometer.

In the bearing device according to a sixth aspect of the present invention, in any one of the first to fourth aspects, a positioning hole may be formed in the bearing pad having the thermometer, and the positioning hole is recessed from an outer surface in the direction of the center axis at a position close to one side in the circumferential direction from a center position of the bearing pad in the circumferential direction, and a positioning member may be provided in the bearing housing, and the positioning member can be inserted into the positioning hole, protrudes in the direction of the center axis from the bearing housing, and supports the bearing pad in the bearing housing.

In this way, since the positioning member and the positioning hole are provided, when the bearing pad having the thermometer is assembled to the bearing housing, even if the bearing pad is forcedly assembled in the opposite direction in the direction of the center axis of the bearing housing, in this case, the position of the positioning hole and the position of the positioning member do not coincide with each other. Accordingly, it is not possible to insert the positioning member into the positioning hole, and it is possible to further increase effects for preventing reverse assembly of the bearing pad having the thermometer.

According to a seventh aspect of the present invention, there is provided a rotary machine, including: the bearing device according to any one of the first to sixth aspects; and a rotary shaft which is rotatably supported by the bearing device.

According to this rotary machine, since the rotary machine has the bearing device, it is not possible to physically assemble the bearing pad to the bearing housing in the opposite direction. Accordingly, it is possible to dispose the thermometer provided in the bearing pad at a predetermined position of the bearing housing and it is possible to accurately measure a temperature of the bearing device.

Advantageous Effects of Invention

According to the bearing device and the rotary machine, it is possible to prevent the reverse assembly of the bearing pad. As a result, it is possible to dispose the thermometer provided in the bearing pad at a predetermined position of the bearing housing and it is possible to accurately measure a temperature of the bearing device.

DESCRIPTION OF EMBODIMENTS

[First Embodiment]

Hereinafter, a steam turbine (rotary machine) 1 according to an embodiment of the present invention will be described.

Figure 1:
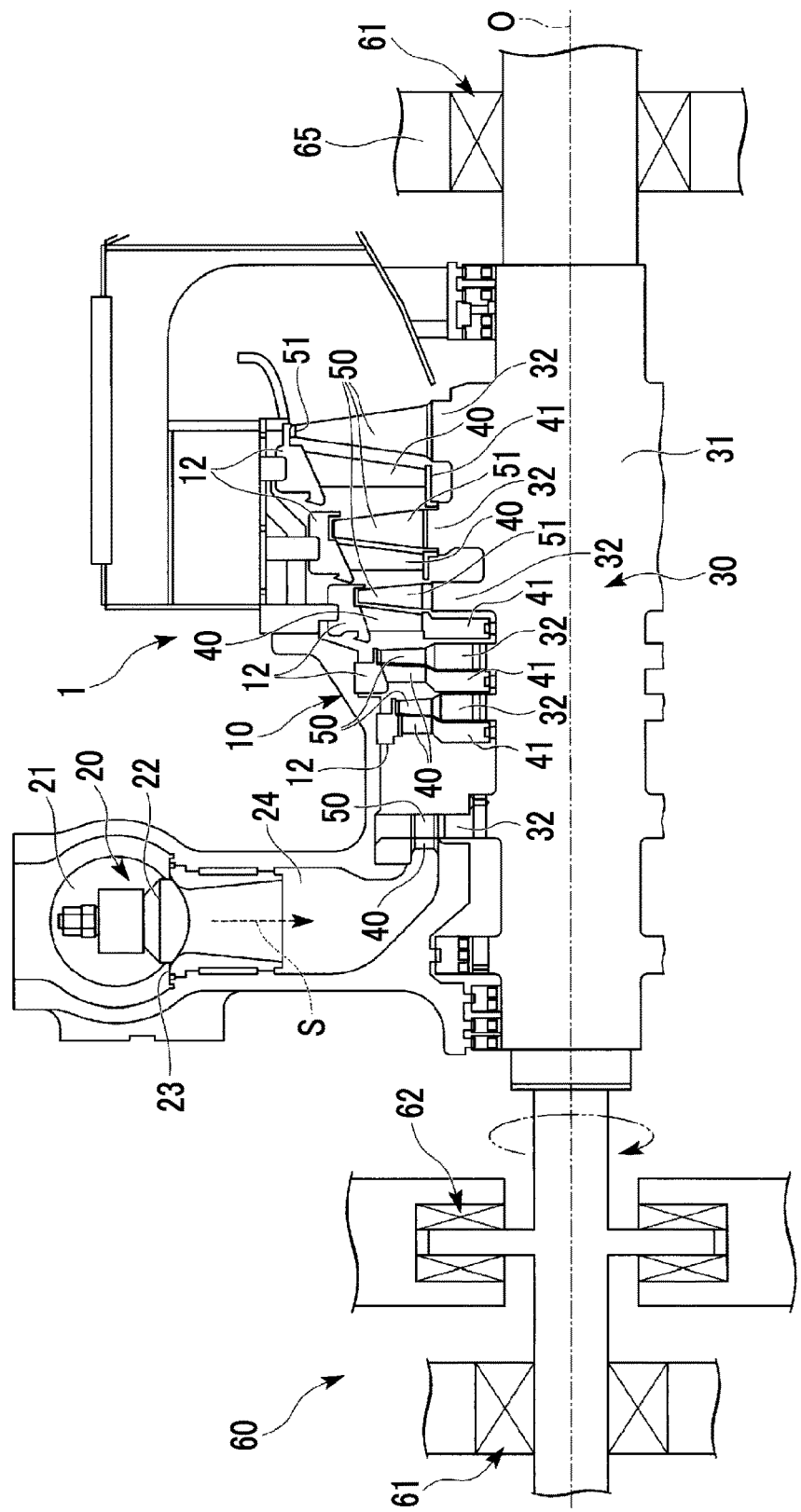
FIG. 1 is a schematic sectional view of a steam turbine in a first embodiment of the present invention.

As shown in FIG. 1, the steam turbine 1 includes a casing 10, a regulating valve 20 which regulates an amount and a pressure of steam S flowing into the casing 10, a turbine rotor 30 which is rotatably provided in an internal space in the casing 10 and transmits power to a machine such as a generator (not shown), a stationary blade row 40 which is fixed to the casing 10, a rotor blade row 50 which is fixed to the turbine rotor 30, and a bearing portion 60 which rotatably supports the turbine rotor 30 around a rotational axis O.

The casing 10 is formed to airtightly seal the internal space and defines a flow path of the steam S.

A plurality of regulating valves 20 are attached to the casing 10, and each of the regulating valves 20 includes a regulating valve chamber 21 into which the steam S flows from a boiler (not shown), a valve body 22, a valve seat 23, and a steam chamber 24. In the regulating valve 20, if the valve body 22 moves away from the valve seat 23, the flow path of the steam S is open, and thereby, the steam S flows into the internal space of the casing 10 via the steam chamber 24.

The turbine rotor 30 includes a rotor body 31 and a plurality of disks 32 which extend from the outer periphery of the rotor body 31 to the outside in the radial direction. The turbine rotor 30 transmits rotational energy to a machine such as a generator (not shown).

The bearing portion 60 is fixed to the casing 10, includes a journal bearing device 61 and a thrust bearing device 62, and rotatably supports the turbine rotor 30 which is inserted into the casing 10.

A plurality of stationary blade rows 40 are provided to be fixed to the casing 10 so as to be separated from each other in the direction of the rotational axis O. The stationary blade rows 40 include a plurality of diaphragm outer rings 12 and diaphragm inner rings 41 which are radially disposed to surround the turbine rotor 30, and configure an annular stationary blade group.

In addition, each stationary blade row 40 converts pressure energy of the steam S into speed energy and guides the steam S to the rotor blade row 50 side which is adjacent to the downstream side in the direction of the rotational axis O and is described later.

The plurality of rotor blade rows 50 are fixed to the outer peripheries of the disks 32 in the turbine rotor 30 and extend from the turbine rotor 30 to the outside in the radial direction. The rotor blade rows 50 include a plurality of rotor blades 51 which are radially disposed in the disk 32, configure an annular rotor blade group, and are alternately disposed on the downstream sides of the stationary blade rows 40.

Next, the journal bearing device 61 will be described in detail.

Figure 2:
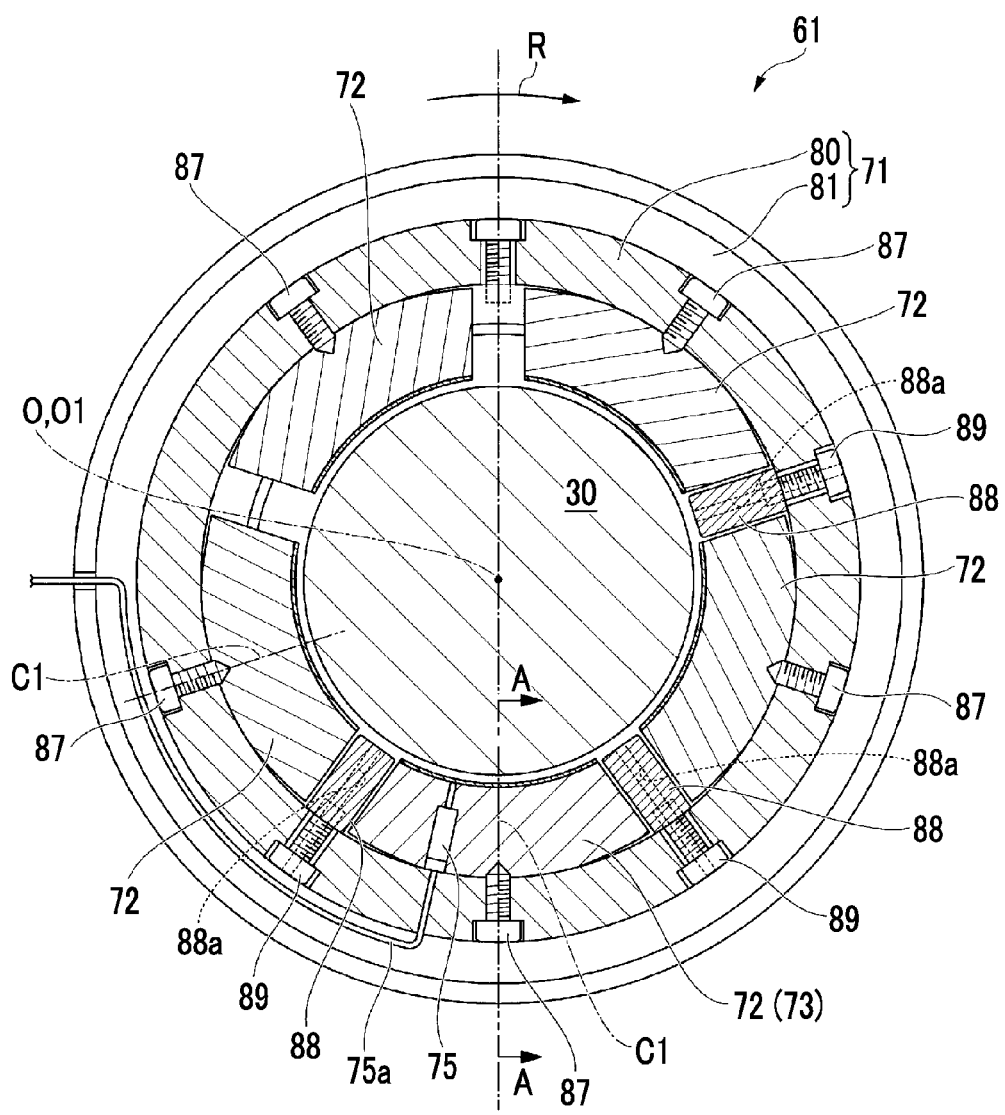
FIG. 2 is a sectional view orthogonal to a center axis of a bearing device in the steam turbine of the first embodiment of the present invention.

As shown in FIG. 2, the journal bearing device 61 (hereinafter, simply referred to as a bearing device 61) includes a bearing housing 71 which surround the turbine rotor (rotary shaft) 30 from the outer peripheral side and is formed in an annular shape about a center axis O1, and a plurality of bearing pads 72 which are disposed between the outer peripheral surface of the turbine rotor 30 and the inner peripheral surface of the bearing housing 71.

In addition, one of the bearing pads 72 becomes a thermometer-equipped pad 73 in which a thermometer 75 is provided in the one bearing pad 72 which supports the turbine rotor 30 from below.

Figure 3:
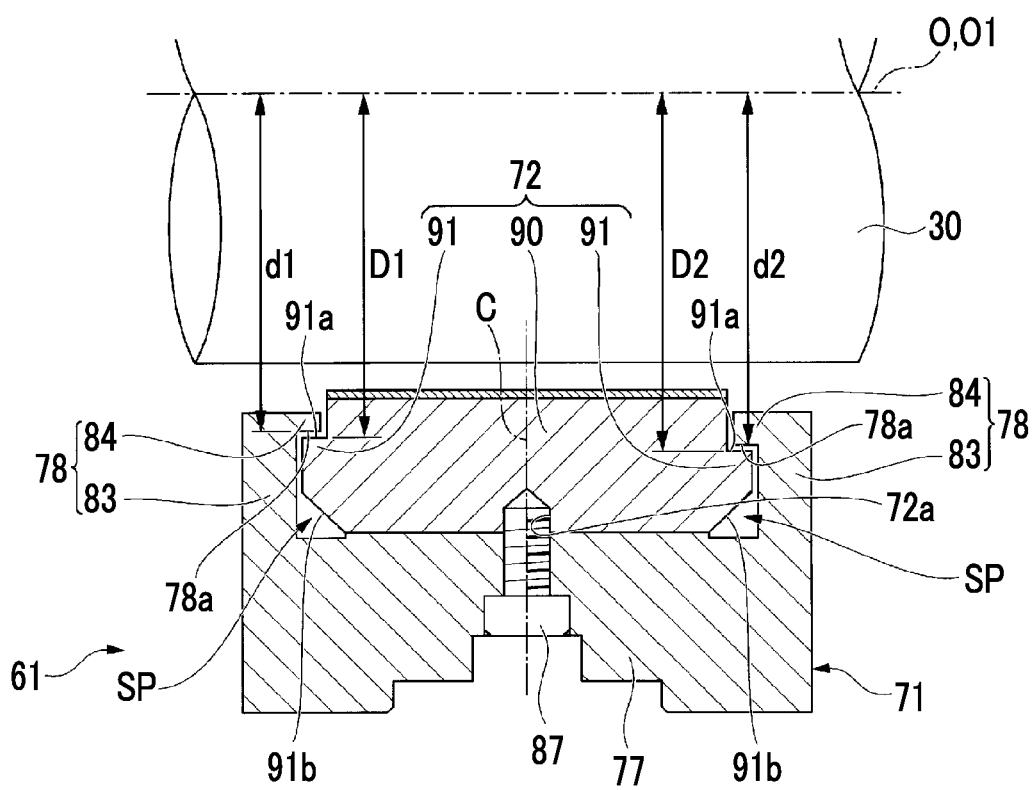
FIG. 3 is a sectional view along the center axis of the bearing device of the steam turbine in the first embodiment of the present invention, and is a sectional view taken along line A-A of FIG. 2.

As shown in FIG. 3, the bearing housing 71 includes a housing body 77 supported by a bearing frame 65 (refer to FIG. 1) which is provided in the casing 10 and is formed in a cylindrical shape, and a pair of housing shoulders 78 which protrudes to both sides in the direction of the center axis O1 from the housing body 77.

Moreover, the center axis O1 of the bearing housing is disposed to be approximately coaxial with the rotational axis O of the turbine rotor 30 in a state where the turbine rotor 30 is attached to the bearing device 61.

The housing body 77 includes an outer ring portion which is disposed on the outside in the radial direction and is formed in a cylindrical shape, and an inner ring portion 81 which is coaxially attached to the inner peripheral surface of the outer ring portion 80 and is formed in a cylindrical shape.

In the present embodiment, for convenience, the outer ring portion 80 and the inner ring portion 81 are described to be separated. However, actually, the outer ring portion 80 and the inner ring portion 81 may be configured to be integrated with each other or may be configured to be separated from each other.

The housing shoulder 78 protrudes from both end portions of the center axis O1 toward the inside in the radial direction from the housing body 77 and is formed in an annular shape about the center axis O1. Each of the pair of housing shoulders 78 includes a radially protruding portion 83 which extends toward the inside in the radial direction, and an axially protruding portion 84 which protrudes from the end portion on the inside in the radial direction of the radially protruding portion 83 toward a center position C of the bearing housing 71 in the direction of the center axis O1.

Accordingly, the housing shoulder 78 has an L shaped cross section along the center axis O1.

In addition, a housing shoulder surface 78a facing the outside in the radial direction is formed on a portion at which the radially protruding portion 83 and the axially protruding portion 84 are connected to each other. In the present embodiment, the housing shoulder surface 78a extends to be parallel to the center axis O1 on a cross section along the center axis O1.

In the pair of housing shoulders 78, distances in the radial direction from the center axis O1 to the pair of housing shoulder surfaces 78a are different from each other, and the housing shoulder surfaces 78a are positioned at positions different from each other in the radial direction. That is, in the housing shoulder 78 which is positioned on one side in the direction of the center axis O1 and is positioned on the left side on the paper surface of FIG. 3, the distance in the radial direction from the center axis O1 to the housing shoulder surface 78a becomes a distance d1, and in the housing shoulder 78 which is positioned on the other side in the direction of the center axis O1, the distance in the radial direction from the center axis O1 to the housing shoulder surface 78a becomes a distance d2 which is longer than the distance d1.

The plurality of (five in the present embodiment) bearing pads 72 are separated by an equal distance from each other in the circumferential direction of the bearing housing 71, and are disposed to be interposed between the outer peripheral surface of the turbine rotor 30 and the inner peripheral surface of the inner ring portion 81. Moreover, the bearing pads 72 rotatably support the turbine rotor 30.

Here, in the present embodiment, since the bearing pads 72 are provided to support a portion immediately below the turbine rotor 30, and the bearing device 61 is a so-called On-Pad type bearing device. In addition, the bearing pad 72 which is provided to support the portion immediately below the turbine rotor 30 becomes the thermometer-equipped pad 73 having the thermometer 75.

In the thermometer 75, a sensor portion is provided to be embedded in the inside of the bearing pad 72. A wire 75a extends from the sensor portion toward the outside in the radial direction and is provided to reach the outside of the bearing device 61 through the outer ring portion 80. The sensor portion of the thermometer 75 is provided at a position close to one side of the bearing pad 72 in the circumferential direction. That is, the sensor portion of the thermometer 75 is provided at a position close to the front side in a rotational direction R of the turbine rotor 30.

An oil supply portion 88 which supplies oil to a portion between the turbine rotor 30 and the inner ring portion 81 of the bearing housing 71 is provided in at least one portion among portions between the bearing pads 72 adjacent to each other in the circumferential direction. In the present embodiment, the oil supply portions 88 are provided on both sides of the thermometer-equipped pad 73 in the circumferential direction and both side of the bearing pads 72 adjacent to each other in the circumferential direction on the front side of the thermometer-equipped pad 73 in the rotational direction R of the turbine rotor 30.

Each the oil supply portion 88 is supported by the portion between the bearing pads 72 by a bolt 89 which is inserted from the outside in the radial direction into the inner ring portion 81. An oil supply hole 88a which penetrating in the radial direction is formed in the bolt 89 and the oil supply portion 88. Oil is supplied from an oil supply device (not shown) into the bearing housing 71 through the oil supply hole 88a, and a portion around the bearing pad 72 is filled with oil.

A positioning bolt (positioning member) 87 which is inserted from the outside of the inner ring portion 81 in the radial direction and protrudes from the housing body 77 toward the inside in the radial direction is provided at the center position C1 of each bearing pad 72 in the circumferential direction and the center position C in the direction of the center axis O1.

That is, a positioning hole 72a into which the positioning bolt 87 can be inserted and screwed is formed at the center position C1 of the bearing pad 72 in the circumferential direction and at the center position C in the direction of the center axis O1. In addition, the bearing pad 72 is swingably supported to the bearing housing 71 in the radial direction by the positioning bolt 87.

As shown in FIG. 3, each bearing pad 72 includes a pad body 90 which is disposed so as to face the outer peripheral surface of the turbine rotor 30 and in which the positioning hole 72a is formed and a pair of pad shoulders 91 which protrudes from the pad body 90 on both side in the direction of the center axis O1.

The pad body 90 is disposed to be interposed between the pair of radially protruding portions 83 of the housing shoulder 78 in the direction of the center axis O1. A surface of the pad body 90 facing the inside in the radial direction faces the outer peripheral surface of the turbine rotor 30 and the pad body 90 has a shape of configuring a portion of a cylindrical surface about the center axis O1.

The pair of pad shoulders 91 protrudes in directions separated from each other in the direction of the center axis O1 from both end portions of the pad body 90 in the direction of the center axis O1, and the pad shoulders 91 have shapes different from each other. Each of the pair of pad shoulders 91 has a shape corresponding to each of the pair of housing shoulders 78.

Specifically, each of the pair of pad shoulders 91 has a pad shoulder surface 91a which is formed so as to face the housing shoulder surface 78a of the housing shoulder 78 in the radial direction.

The pad shoulder surface 91a extends to be parallel to the center axis O1 on a cross section along the center axis O1. In addition, the pad shoulder surfaces 91a are disposed at positions different from each other in the radial direction. That is, in the pad shoulder 91 which is positioned on one side in the direction of the center axis O1, the distance in the radial direction from the center axis O1 to the pad shoulder surface 91a becomes a distance D1, and in the pad shoulder 91 which is positioned on the other side in the direction of the center axis O1, the distance in the radial direction from the center axis O1 to the pad shoulder surface 91a becomes a distance D2 which is longer than the distance D1.

Moreover, an inclined surface 91b which is formed to be inclined so as to be separated from the radially protruding portion 83 toward the outside in the radial direction on the cross section along the center axis O1 on the outside of the pad shoulder 91 in the radial direction and at the position of the pad shoulder 91 facing the radially protruding portion 83. Accordingly, a gap SP having a triangular cross section is formed between the radially protruding portion 83 and the pad shoulder 91. Although it is not shown, the wire 75a of the thermometer 75 passes through the gap SP.

According to the steam turbine 1 of the above-described present embodiment, the bearing pad 72 provided in the bearing device 61 has the pair of pad shoulders 91 having shapes different from each other. In addition, the bearing housing 71 has the housing shoulder 78 corresponding to the shape of each pad shoulder 91.

Accordingly, when the bearing pads 72 are assembled to the bearing housing 71, the bearing pads 72 are not assembled in the opposite direction in the direction of the center axis O1 of the bearing housing 71. That is, the bearing pads 72 cannot be physically assembled to the bearing housing 71 in the opposite direction.

Accordingly, it is possible to correctly assemble the thermometer-equipped pad 73 to the bearing housing 71, it is possible to dispose the thermometer 75 at a predetermined position of the bearing housing 71, and it is possible to accurately measure a temperature of the bearing device 61.

[Second Embodiment]

Figure 4:
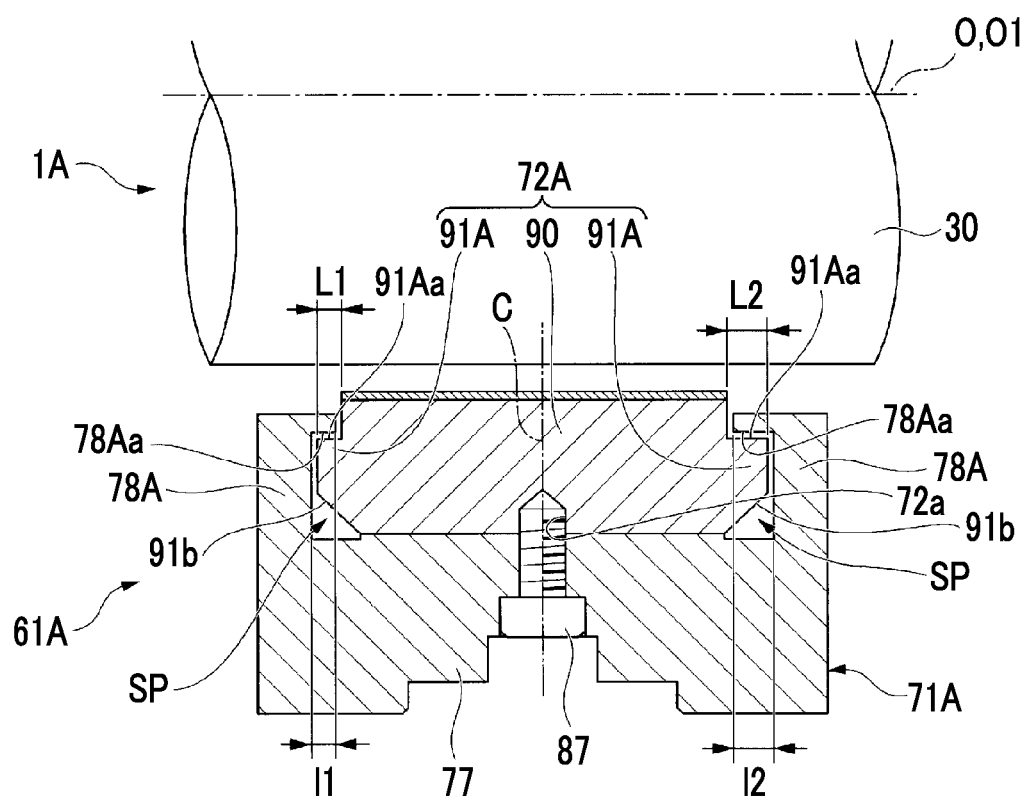
FIG. 4 is a sectional view along a center axis of a bearing device in a steam turbine in a second embodiment of the present invention, and is a sectional view of a cross section corresponding to the cross section taken along line A-A of FIG. 2.

Next, a second embodiment of the present invention will be described with reference to FIG. 4.

The same reference numerals are assigned to components similar to those of the first embodiment, and detail descriptions thereof are omitted.

In a steam turbine 1A of the present embodiment, bearing pads 72A of a bearing device 61A are different from those of the first embodiment.

In the bearing pad 72A, in a pair of pad shoulders 91A, length dimensions of a pair of pad shoulder surfaces 91Aa in the direction of the center axis O1 are different from each other.

Specifically, the pair of pad shoulder surfaces 91Aa extends to be parallel to the center axis O1 on a cross section along the center axis O1. In addition, in one pad shoulder 91A in the direction of the center axis O1, a length dimension of the pad shoulder surface 91Aa in the direction of the center axis O1 becomes L1. Meanwhile, in the other pad shoulder 91A in the direction of the center axis O1, a distance of the pad shoulder surface 91Aa in the direction of the center axis O1 becomes L2 which is larger than L1.

In order to correspond to the pad shoulder surfaces 91Aa, in one housing shoulder 78A in the direction of the center axis O1 of a pair of housing shoulder surfaces 78Aa, a length dimension of the housing shoulder surface 78Aa in the direction of the center axis O1 becomes l1, and in the other housing shoulder 78A in the direction of the center axis O1, a length dimension of the housing shoulder surface 78Aa in the direction of the center axis O1 becomes l2 which is larger than l1.

Even in the steam turbine 1A of the above-described present invention, in the pair of pad shoulders 91A, since the length dimensions of the pad shoulder surfaces 91Aa in the direction of the center axis O1 are different from each other, it is not possible to physically assemble the bearing pads 72A to a bearing housing 71A in the opposite direction in the direction of the center axis O1.

Accordingly, it is possible to correctly assemble the bearing pads 72A, it is possible to dispose the thermometer 75 at a predetermined position of the bearing housing 71A, and it is possible to accurately measure a temperature of the bearing device 61A.

[Third Embodiment]

Figure 5:
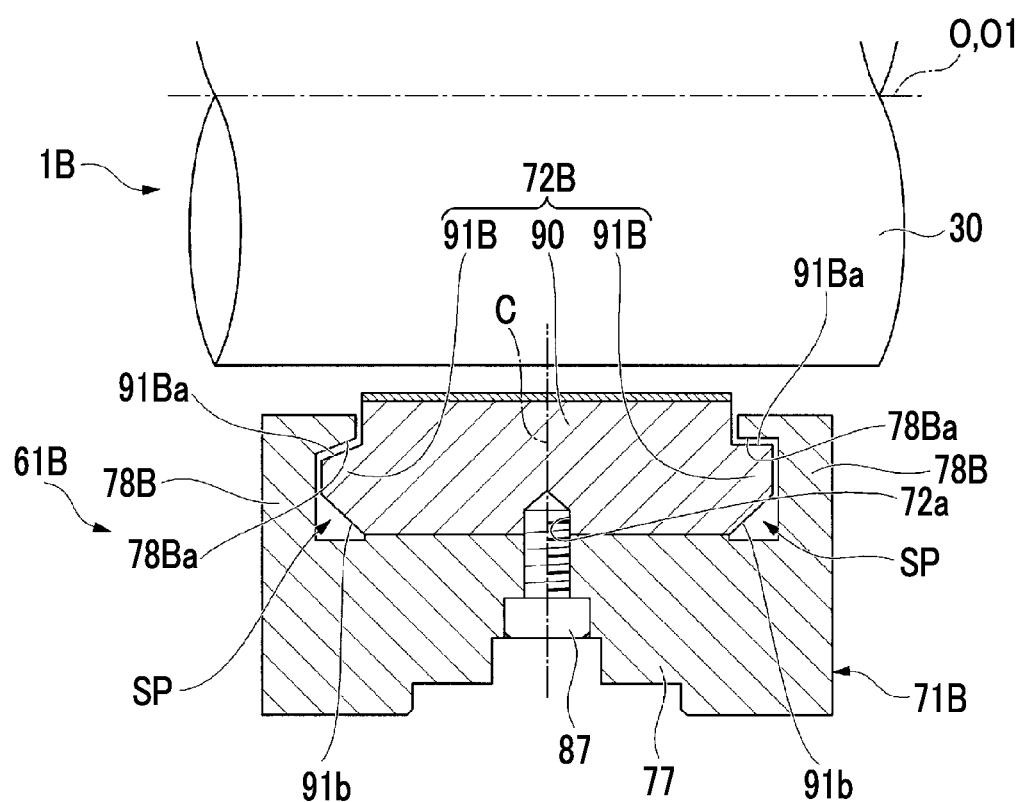
FIG. 5 is a sectional view along a center axis of a bearing device in a steam turbine in a third embodiment of the present invention, and is a sectional view of a cross section corresponding to the cross section taken along line A-A of FIG. 2.

Next, a third embodiment of the present invention will be described with reference to FIG. 5.

The same reference numerals are assigned to components similar to those of the first embodiment, and detail descriptions thereof are omitted.

In a steam turbine 1B of the present embodiment, bearing pads 72B of a bearing device 61B are different from those of the first and second embodiments.

In the bearing pad 72B, a pad shoulder surface 91Ba in one pad shoulder 91B in the direction of the center axis O1 becomes an inclined surface which is inclined to move close to the outer peripheral surface of the turbine rotor 30 from one side of the center axis O1 toward the other side, that is, to move close to the center axis O1. Meanwhile, a pad shoulder surface 91Ba in the other pad shoulder 91B in the direction of the center axis O1 extends along the center axis O1.

A housing shoulder surface 78Ba of a housing shoulder 78B is formed in a shape corresponding to that of the pad shoulder surface 91Ba.

According to the steam turbine 1B of the above-described present embodiment, since the pad shoulder surface 91Ba of one pad shoulder 91B is formed as the inclined surface, it is not possible to physically assemble the bearing pads 72B to the bearing housing 71B in the opposite direction in the direction of the center axis O1. Accordingly, it is possible to correctly assemble the bearing pads 72B, it is possible to dispose the thermometer 75 at a predetermined position of the bearing housing 71B, and it is possible to accurately measure a temperature of the bearing device 61B.

Figure 6:
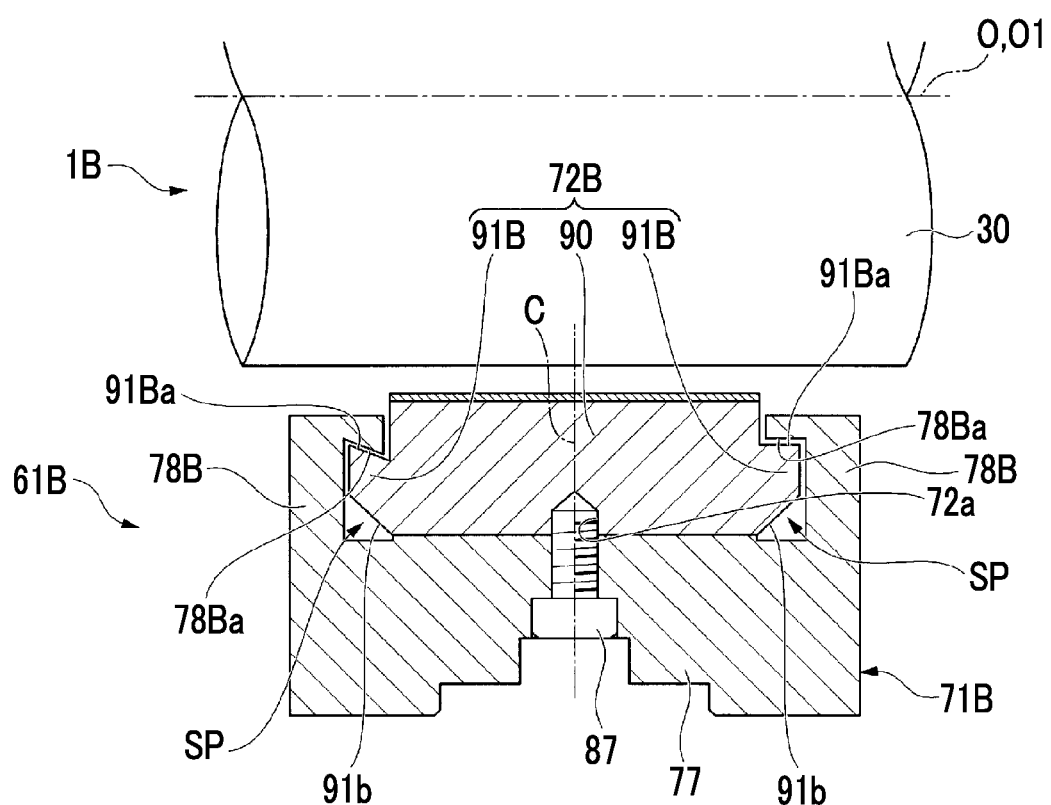
FIG. 6 is a sectional view along a center axis of a bearing device in a steam turbine in a first modification example of the third embodiment of the present invention, and is a sectional view of a cross section corresponding to the cross section taken along line A-A of FIG. 2.

Here, in the present embodiment, as shown in FIG. 6, one pad shoulder surface 91Ba in the direction of the center axis O1 may be an inclined surface which is inclined to move close to the outer peripheral surface of the turbine rotor 30 from one side of the center axis O1 toward the other side and to move close to the center axis O1. That is, the pad shoulder surface 91Ba may be inclined in the direction opposite to the direction of the case shown in FIG. 5.

Figure 7:
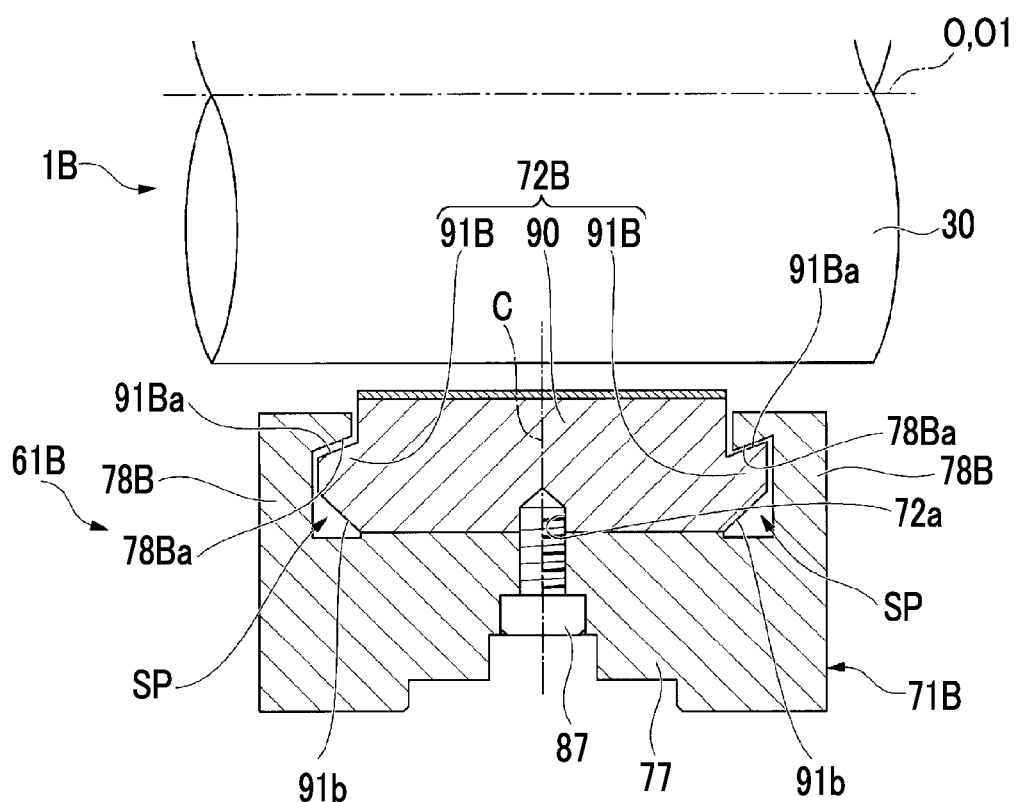
FIG. 7 is a sectional view along a center axis of a bearing device in a steam turbine in a second modification example of the third embodiment of the present invention, and is a sectional view of a cross section corresponding to the cross section taken along line A-A of FIG. 2.

Moreover, as shown in FIG. 7, the pad shoulder surface 91Ba of the other pad shoulder 91B in the direction of the center axis O1 may be also formed as an inclined surface. In this case, for example, the pad shoulder surface 91Ba of one pad shoulder 91B in the direction of the center axis O1 and the pad shoulder surface 91Ba of the other pad shoulder 91B in the direction of the center axis O1 may be formed so as to be inclined in the same direction. That is, one pad shoulder surface 91Ba is formed to move close to the outer peripheral surface (or to move away from the outer peripheral surface) of the turbine rotor 30 from the one side in the direction of the center axis O1 toward the other side, and the other pad shoulder surface 91Ba is formed to move away from the outer peripheral surface (or to move close to the outer peripheral surface) of the turbine rotor 30 from the one side in the direction of the center axis O1 toward the other side.

Figure 8:
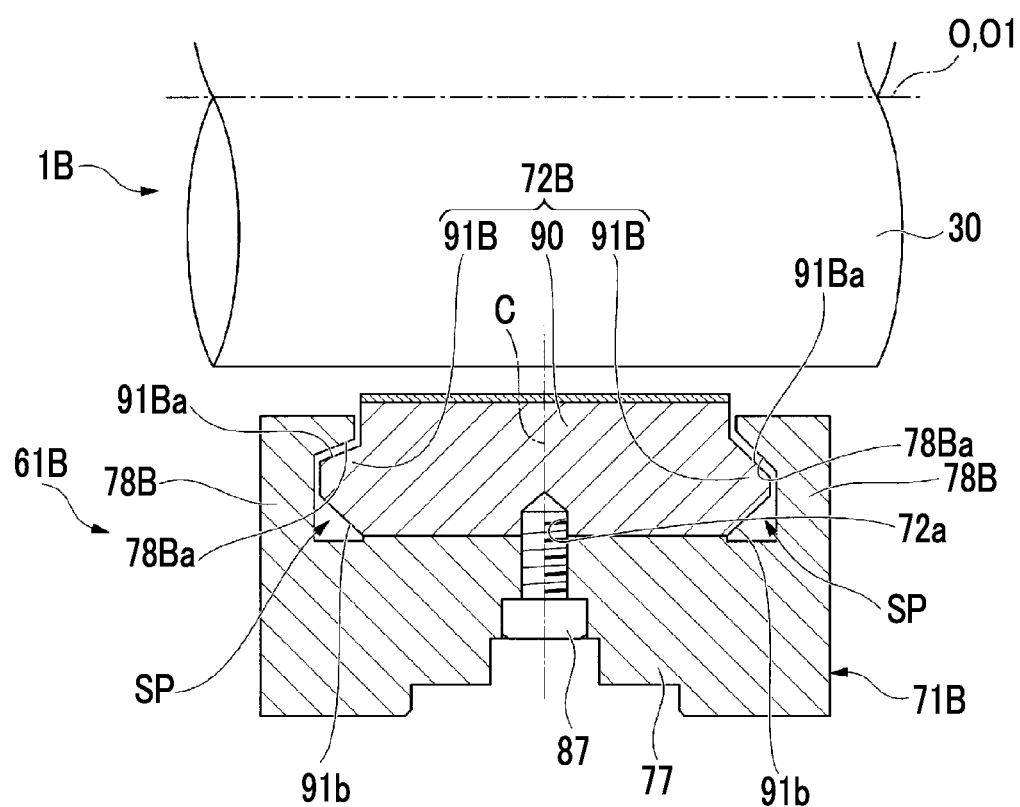
FIG. 8 is a sectional view along a center axis of a bearing device in a steam turbine in a third modification example of the third embodiment of the present invention, and is a sectional view of a cross section corresponding to the cross section taken along line A-A of FIG. 2.

In the present embodiment, as shown in FIG. 8, the one pad shoulder surface 91Ba and the other pad shoulder surface 91Ba may be formed as inclined surfaces, and the inclination angles may be different from each other. That is, it is enough if the shapes of one pad shoulder 91B and the other pad shoulder 91B are different from each other.

[Fourth Embodiment]

Figure 9:
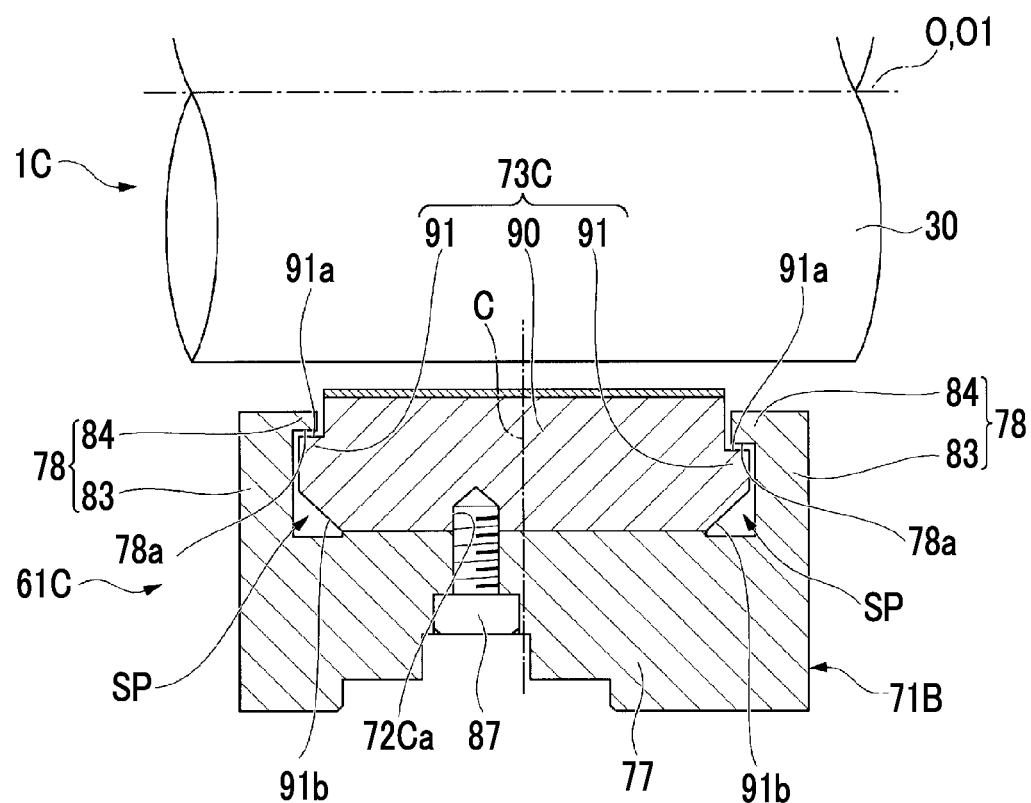
FIG. 9 is a sectional view along a center axis of a bearing device in a steam turbine in a fourth embodiment of the present invention, and is a sectional view of a cross section corresponding to the cross section taken along line A-A of FIG. 2.

Next, a fourth embodiment of the present invention will be described with reference to FIG. 9.

The same reference numerals are assigned to components similar to those of the first to third embodiments, and detail descriptions thereof are omitted.

In a steam turbine 1C of the present embodiment, the positions of the positioning bolt 87 and a positioning hole 72Ca provided in a thermometer-equipped pad 73C of a bearing device 61C are different from those of the first to third embodiments.

In the thermometer-equipped pad 73C, the pad shoulders 91 similar to those of the first embodiment are provided. The positioning bolt 87 provided in the thermometer-equipped pad 73C is provided at a position close to one side in the direction of the center axis O1 from the center position C of the thermometer-equipped pad 73C in the direction of the center axis O1. Similarly, the positioning hole 72Ca is also provided at a position close to one side in the direction of the center axis O1 from the center position C in the direction of the center axis O1.

Although it is not shown, similarly to the first to third embodiments, the positions of the positioning bolt and the positioning hole 72Ca in the circumferential direction are the center position C1 in the circumferential direction.

According to the steam turbine 10 of the above-described present embodiment, when the thermometer-equipped pad 73C is assembled to the bearing housing 71C, even if the thermometer-equipped pad 73C is forcedly assembled in the opposite direction in the direction of the center axis O1, the position of the positioning hole 72Ca does not coincide with the position of the positioning bolt 87.

Accordingly, the positioning bolt 87 cannot be inserted into the positioning hole 72Ca, and it is possible to further increase effects for preventing the reverse assembly of the thermometer-equipped pad 73C.

[Fifth Embodiment]

Figure 10:
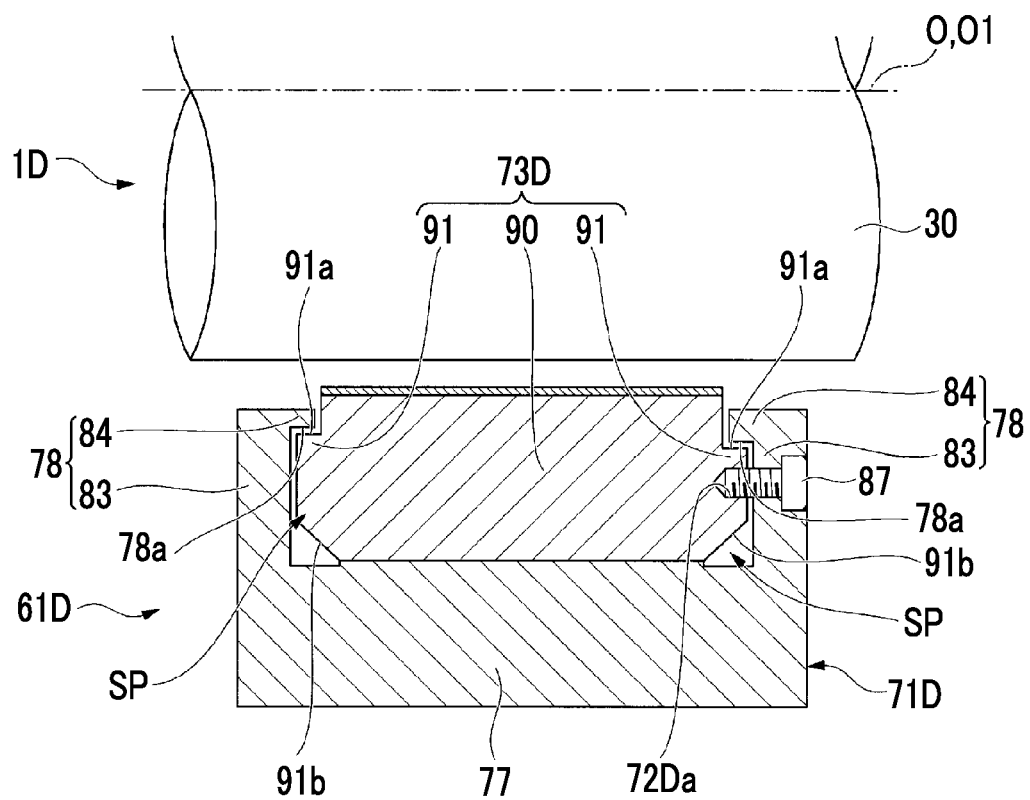
FIG. 10 is a sectional view along a center axis of a bearing device in a steam turbine in a fifth embodiment of the present invention, and is a sectional view of a cross section corresponding to the cross section taken along line A-A of FIG. 2.

Next, a fifth embodiment of the present invention will be described with reference to FIGS. 10 and 11.

The same reference numerals are assigned to components similar to those of the first to fourth embodiments, and detail descriptions thereof are omitted.

In a steam turbine 1D of the present embodiment, the positions of the positioning bolt 87 and a positioning hole 72Da provided in a bearing device 61D are different from those of the first to fourth embodiments.

The positioning bolt 87 provided in a thermometer-equipped pad 73D does not protrude in the radial direction from the bearing housing 71, and protrudes toward the thermometer-equipped pad 73D from one side in the direction of the center axis O1 toward the other side.

Figure 11:
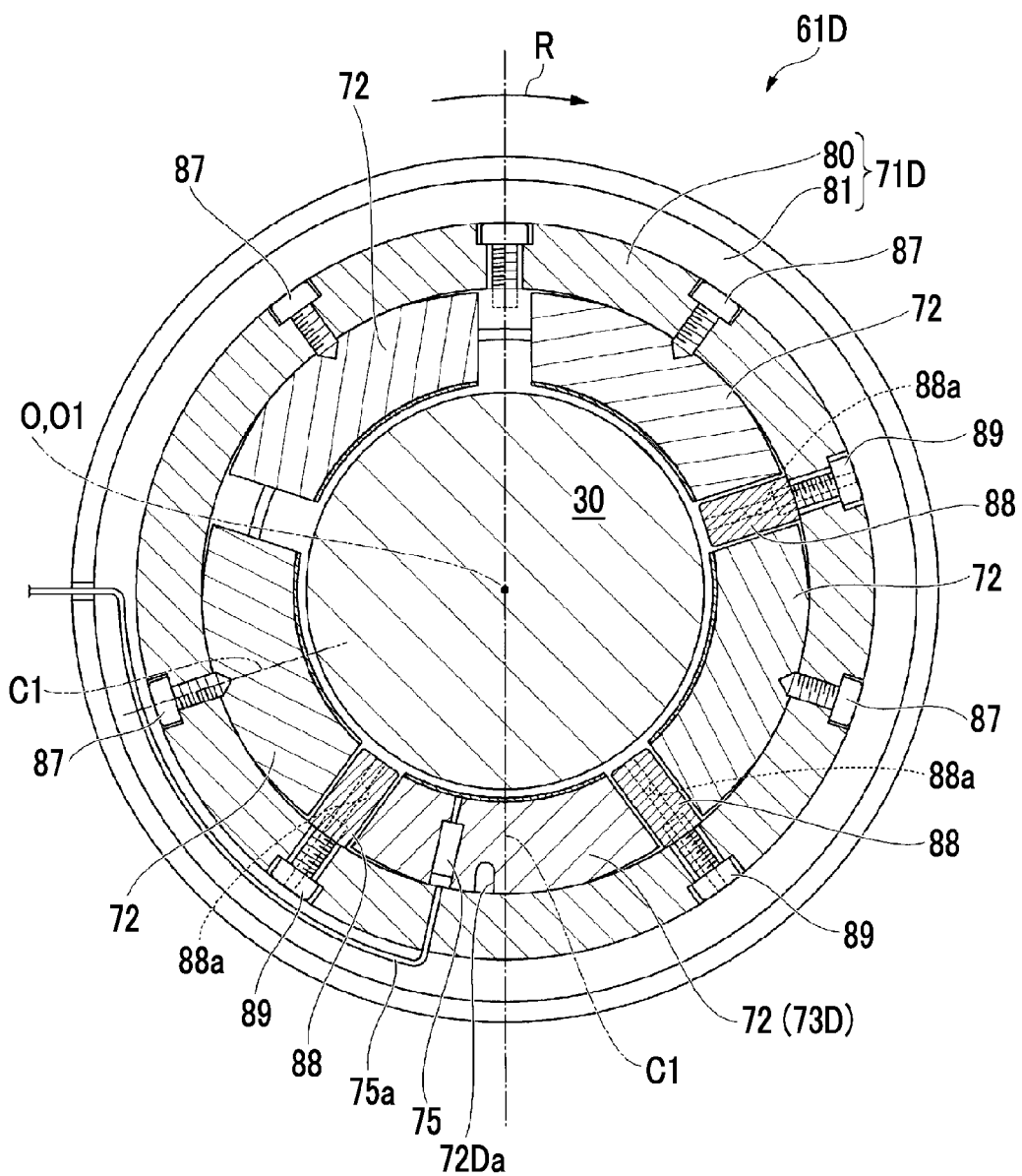
FIG. 11 is a sectional view orthogonal to the center axis of the bearing device in the steam turbine of the fifth embodiment of the present invention.

Specifically, as shown in FIG. 11, the positioning bolt 87 of the thermometer-equipped pad 73D is provided at a position close to one side in the circumferential direction from a center position C1 of the thermometer-equipped pad 73D in the circumferential direction so as to protrude in the direction of the center axis O1 from the radially protruding portion 83 in the other housing shoulder 78 in the direction of the axis O1.

Similarly, a positioning hole 72Da is provided at a position close to one side in the circumferential direction from the center position C1 of the thermometer-equipped pad 73D in the circumferential direction.

According to the steam turbine 1D of the above-described present embodiment, when the thermometer-equipped pad 73D is assembled to the bearing housing 71, even if the thermometer-equipped pad 73D is forcedly assembled in the opposite direction in the direction of the center axis O1, the position of the positioning hole 72Da does not coincide with the position of the positioning bolt 87. Accordingly, the positioning bolt 87 cannot be inserted into the positioning hole 72Da, and it is possible to further increase effects for preventing the reverse assembly of the thermometer-equipped pad 73D.

Hereinbefore, the embodiments of the present invention are described with reference to the drawings. However, the configurations of the embodiments, combinations thereof, or the like are exemplified, and addition, omission, replacement, and other modifications of components can be applied within a scope which does not depart from the gist of the invention. Moreover, the present invention is not limited by the embodiments and is limited by only claims.

For example, the shapes of the pair of pad shoulders (91A, 91B) may be different from each other in only the thermometer-equipped pad 73 (73C, 73D). In this case, the pair of housing shoulders 78 (78A, 78B) in the bearing housing 71 (71A, 71B, 71C, 71D) may be formed such that the shapes of the housing shoulders may be different from each other at only the position at which the thermometer-equipped pad 73 (73C, 73D) is provided. In this case, a study for dividing the structure of the bearing housing 71 (71A, 71B, 71C, 71D) or like is required such that the thermometer-equipped pad 73 (73C, 73D) can be assembled to the bearing housing 71.

The above-described embodiments can be appropriately combined. For example, the pair of pad shoulders may be provided such that the distances from the center axis O1 to the pad shoulder surfaces are different from each other as the first embodiment and the length dimensions of the pad shoulder surfaces in the direction of the center axis O1 are different from each other as the second embodiment.

Figure 12:
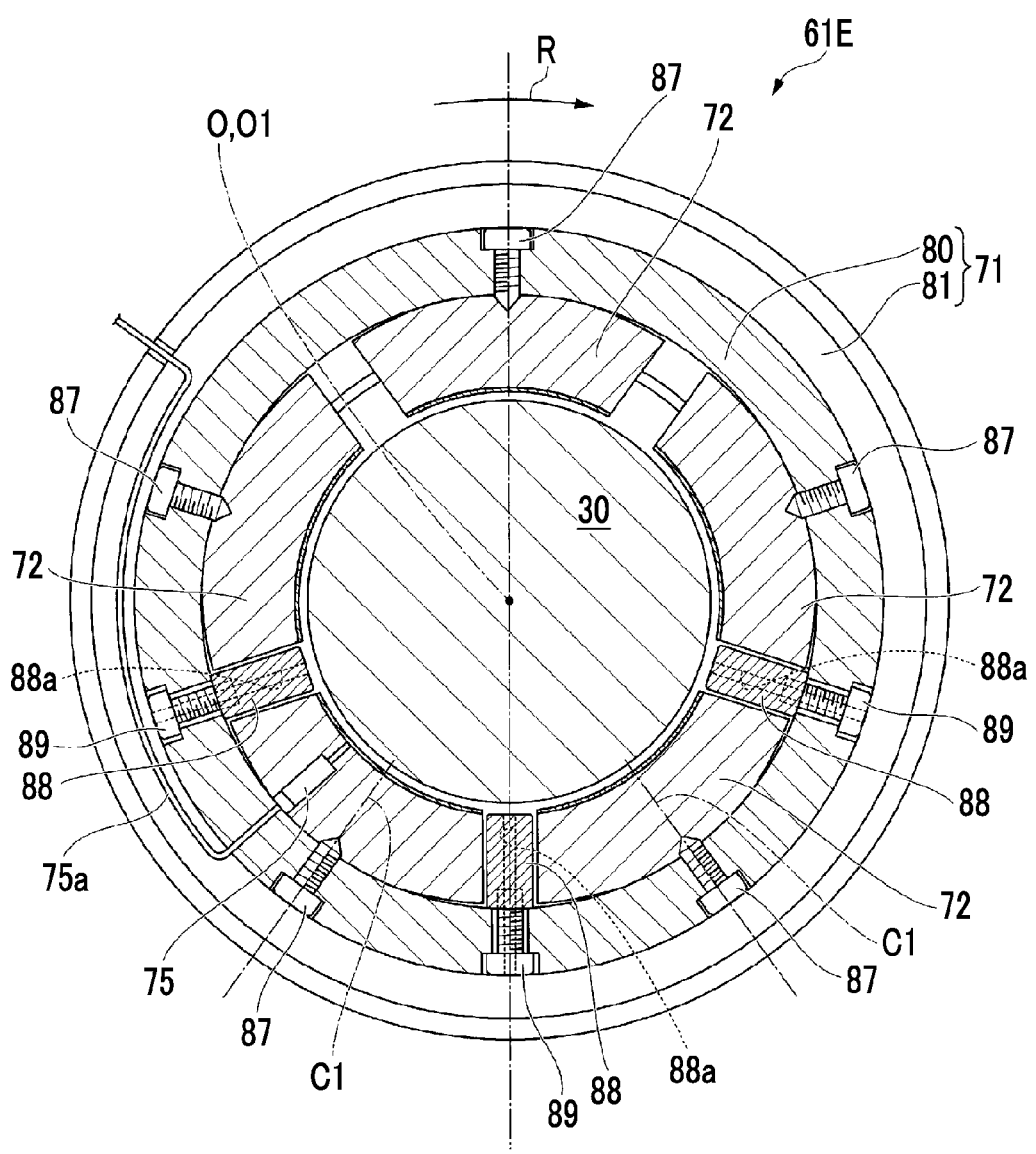
FIG. 12 is a sectional view orthogonal to a center axis of a bearing device in a steam turbine in a modification example of each embodiment of the present invention.

In addition, as shown in FIG. 12, the configurations of the above-described embodiments can be also applied to a Between-Pad type bearing device 61E in which the turbine rotor 30 is supported by two bearing pads 72 at the lower portion.

In addition, in the above-described embodiments, the example in which the bearing device 61 (61A, 61B, 61C, 61D, 61E) is provided in the steam turbine 1 (1A, 1B, 10, 1D) is described. However, for example, the bearing device 61 (61A, 61B, 61C, 61D, 61E) can be also applied to a compressor or the like as the rotary machine.

INDUSTRIAL APPLICABILITY

According to the above-described bearing device and rotary machine, it is possible to prevent the reverse assembly of the bearing pad.

REFERENCE SIGNS LIST 1, 1A, 1B, 10, 1D: steam turbine (rotary machine)
10: casing
12: diaphragm outer ring
20: regulating valve
21: regulating valve chamber
22: valve body
23: valve seat
24: steam chamber
30: turbine rotor (rotary shaft)
31: rotor body
32: disk
40: stationary blade row
41: diaphragm inner ring
50: rotor blade row
51: rotor blade
60: bearing portion
61, 61A, 61B, 61C, 61D, 61E: journal bearing device
62: thrust bearing device
65: bearing frame
71, 71A, 71B, 71C, 71D: bearing housing
72, 72A, 72B: bearing pad
72a, 72Ca, 72Da: positioning hole
73, 73C, 73D: thermometer-equipped pad
75: thermometer
75a: wire
77: housing body
78, 78A, 78B: housing shoulder
78a, 78Aa, 78Ba: housing shoulder surface
80: outer ring portion
81: inner ring portion
83: radially protruding portion
84: axially protruding portion
87: positioning bolt (positioning member)
88: oil supply portion
88a: oil supply hole
89: bolt
90: pad body
91, 91A, 91B: pad shoulder
91a, 91Aa, 91Ba: pad shoulder surface
91b: inclined surface
R: rotational direction
SP: gap
O1: center axis
O: rotational axis
S: steam

The invention claimed is:

1. A bearing device, comprising:
a bearing housing which is formed in an annular shape and surrounds a rotary shaft from an outer peripheral side;
a plurality of bearing pads which are disposed between an outer peripheral surface of the rotary shaft and an inner peripheral surface of the bearing housing so as to be separated from each other in a circumferential direction of the rotary shaft, the bearing pads being supported on the inner peripheral surface of the bearing housing and rotatably supporting the rotary shaft; and
a thermometer which is provided in at least one of the plurality of bearing pads,
wherein the bearing pad having the thermometer includes a pad body which is disposed to face the outer peripheral surface of the rotary shaft, and a pair of pad shoulders which protrudes from the pad body to both sides of the bearing housing in a direction of a center axis of the bearing housing and has shapes different from each other, and
wherein the bearing housing includes a pair of housing shoulders having a shape corresponding to that of each of the pair of pad shoulders.

2. The bearing device according to claim 1,
wherein a positioning hole is formed in the bearing pad having the thermometer, and the positioning hole is recessed from an outer surface in the direction of the center axis at a position close to one side in the circumferential direction from a center position of the bearing pad in the circumferential direction, and
wherein a positioning member is provided in the bearing housing, and the positioning member can be inserted into the positioning hole, protrudes in the direction of the center axis from the bearing housing, and supports the bearing pad in the bearing housing.

3. A rotary machine, comprising:
the bearing device according to claim 1; and
a rotary shaft which is rotatably supported by the bearing device.

4. The bearing device according to claim 1,
wherein a positioning hole is formed in the bearing pad having the thermometer, the positioning hole is recessed from the outside in the radial direction at a position close to one side in the direction of the center axis from a center position of the bearing pad in the direction of the center axis, and
wherein a positioning member is provided in the bearing housing, and the positioning member can be inserted into the positioning hole, protrudes from the bearing housing to the inside in the radial direction, and supports the bearing pad in the bearing housing.

5. A rotary machine, comprising:
the bearing device according to claim 4; and
a rotary shaft which is rotatably supported by the bearing device.

6. The bearing device according to claim 1,
wherein each of the pair of pad shoulders includes the pad shoulder surface which faces the center axis side and is disposed along the center axis, and
wherein the pad shoulder surface of one pad shoulder is inclined to move close to or away from the center axis from one side of the center axis toward the other side thereof.

7. The bearing device according to claim 6,
wherein a positioning hole is formed in the bearing pad having the thermometer, the positioning hole is recessed from the outside in the radial direction at a position close to one side in the direction of the center axis from a center position of the bearing pad in the direction of the center axis, and
wherein a positioning member is provided in the bearing housing, and the positioning member can be inserted into the positioning hole, protrudes from the bearing housing to the inside in the radial direction, and supports the bearing pad in the bearing housing.

8. The bearing device according to claim 6,
wherein a positioning hole is formed in the bearing pad having the thermometer, and the positioning hole is recessed from an outer surface in the direction of the center axis at a position close to one side in the circumferential direction from a center position of the bearing pad in the circumferential direction, and
wherein a positioning member is provided in the bearing housing, and the positioning member can be inserted into the positioning hole, protrudes in the direction of the center axis from the bearing housing, and supports the bearing pad in the bearing housing.

9. A rotary machine, comprising:
the bearing device according to claim 6; and
a rotary shaft which is rotatably supported by the bearing device.

10. The bearing device according to claim 1,
wherein each of the pair of pad shoulders includes the pad shoulder surface which faces the center axis side and is disposed along the center axis, and
wherein length dimensions of the pad shoulder surfaces of the pair of pad shoulders in a direction of the center axis are different from each other.

11. The bearing device according to claim 10,
wherein each of the pair of pad shoulders includes the pad shoulder surface which faces the center axis side and is disposed along the center axis, and
wherein the pad shoulder surface of one pad shoulder is inclined to move close to or away from the center axis from one side of the center axis toward the other side thereof.

12. The bearing device according to claim 10,
wherein a positioning hole is formed in the bearing pad having the thermometer, the positioning hole is recessed from the outside in the radial direction at a position close to one side in the direction of the center axis from a center position of the bearing pad in the direction of the center axis, and
wherein a positioning member is provided in the bearing housing, and the positioning member can be inserted into the positioning hole, protrudes from the bearing housing to the inside in the radial direction, and supports the bearing pad in the bearing housing.

13. The bearing device according to claim 10,
wherein a positioning hole is formed in the bearing pad having the thermometer, and the positioning hole is recessed from an outer surface in the direction of the center axis at a position close to one side in the circumferential direction from a center position of the bearing pad in the circumferential direction, and
wherein a positioning member is provided in the bearing housing, and the positioning member can be inserted into the positioning hole, protrudes in the direction of the center axis from the bearing housing, and supports the bearing pad in the bearing housing.

14. A rotary machine, comprising:
the bearing device according to claim 10; and
a rotary shaft which is rotatably supported by the bearing device.

15. The bearing device according to claim 1,
wherein each of the pair of pad shoulders includes a pad shoulder surface which faces the center axis side and is disposed along the center axis, and
wherein distances from the center axis to the pad shoulder surfaces of the pair of pad shoulders in the radial direction are different from each other.

16. The bearing device according to claim 15,
wherein each of the pair of pad shoulders includes the pad shoulder surface which faces the center axis side and is disposed along the center axis, and
wherein length dimensions of the pad shoulder surfaces of the pair of pad shoulders in a direction of the center axis are different from each other.

17. The bearing device according to claim 15,
wherein each of the pair of pad shoulders includes the pad shoulder surface which faces the center axis side and is disposed along the center axis, and
wherein the pad shoulder surface of one pad shoulder is inclined to move close to or away from the center axis from one side of the center axis toward the other side thereof.

18. The bearing device according to claim 15,
wherein a positioning hole is formed in the bearing pad having the thermometer, the positioning hole is recessed from the outside in the radial direction at a position close to one side in the direction of the center axis from a center position of the bearing pad in the direction of the center axis, and
wherein a positioning member is provided in the bearing housing, and the positioning member can be inserted into the positioning hole, protrudes from the bearing housing to the inside in the radial direction, and supports the bearing pad in the bearing housing.

19. The bearing device according to claim 15,
wherein a positioning hole is formed in the bearing pad having the thermometer, and the positioning hole is recessed from an outer surface in the direction of the center axis at a position close to one side in the circumferential direction from a center position of the bearing pad in the circumferential direction, and
wherein a positioning member is provided in the bearing housing, and the positioning member can be inserted into the positioning hole, protrudes in the direction of the center axis from the bearing housing, and supports the bearing pad in the bearing housing.

20. A rotary machine, comprising:
the bearing device according to claim 15; and
a rotary shaft which is rotatably supported by the bearing device.

* * * * *